(12) United States Patent
Giladi (10) Patent No.: US 11,470,139 B2
(45) Date of Patent: Oct. 11, 2022

(54) VIDEO ENCODING FOR LOW-CONCURRENCY LINEAR CHANNELS

(71) Applicant: Comcast Cable Communications, LLC, Philadelphia, PA (US)

(72) Inventor: Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/909,795

(22) Filed: Jun. 23, 2020

(65) Prior Publication Data

US 2021/0400102 A1 Dec. 23, 2021

(51) Int. Cl.
*H04L 65/70* (2022.01)

(52) U.S. Cl.
CPC .................... *H04L 65/70* (2022.05)

(58) Field of Classification Search
CPC .............. H04L 65/607; H04N 21/2187; H04N 21/234309; H04N 21/8456
See application file for complete search history.

(56) References Cited

U.S. PATENT DOCUMENTS

| | | | | |
|---|---|---|---|---|
| 8,453,148 B1* | 5/2013 | Hobbs | ...................... | G06F 9/452 718/102 |
| 9,053,070 B1* | 6/2015 | Arguelles | ............ | G06F 11/3684 |
| 10,116,721 B1* | 10/2018 | LaPier | ................ | H04L 65/4084 |
| 10,349,059 B1* | 7/2019 | Good | ................... | H04N 19/115 |
| 2003/0023982 A1* | 1/2003 | Lee | .................... | H04N 21/2662 725/138 |
| 2006/0288397 A1* | 12/2006 | Uchida | ............ | H04N 21/26208 725/115 |
| 2009/0238479 A1* | 9/2009 | Jaggi | .................... | H04N 19/172 382/236 |
| 2014/0286390 A1* | 9/2014 | Fear | ....................... | H04N 19/42 375/240.01 |

(Continued)

OTHER PUBLICATIONS

Timmerer et al., "Transcoding and Streaming-as-a-Service for improved Video Quality on the Web", MMSys 2016, May 10, 2016, ACM Publishing, 3 pages total.*

(Continued)

*Primary Examiner* — Todd L Barker
(74) *Attorney, Agent, or Firm* — BakerHostetler (57) ABSTRACT

Systems, methods, and devices relating to video encoding for low-concurrency video channels are described herein. A video processing system may receive a manifest request for an encoded video stream associated with a selected channel. Based on the manifest request, the video processing system may request for a real-time linear (RTL) encoder to be started to encode the input compressed video stream for the channel in real-time. Also based on the manifest request, the video processing system may assign a faster-than-real-time (FTRT) encoder from a pool of already-running FTRT encoders to encode the video stream in real-time until the RTL encoder is fully started. The FTRT encoder may encode at a lower quality level to enable expedited real-time encoding. Based on the RTL encoder being fully started, the video processing system may switch the encoding from the FTRT encoder to the RTL encoder. The FTRT encoder may be returned to the FTRT encoder pool.

23 Claims, 3 Drawing Sheets

(56) References Cited

U.S. PATENT DOCUMENTS

| | | | | | |
|---|---|---|---|---|---|
| 2015/0163486 | A1* | 6/2015 | Li | ............................ | H04N 19/14 375/240.25 |
| 2015/0271356 | A1* | 9/2015 | Terada | ................ | H04N 5/23229 348/231.99 |
| 2016/0029032 | A1* | 1/2016 | Iwasaki | .................. | H04N 19/42 382/234 |
| 2016/0088050 | A1* | 3/2016 | Einarsson | ............ | H04L 65/4084 709/231 |
| 2016/0134881 | A1* | 5/2016 | Wang | ................... | G06F 9/45558 375/240.02 |
| 2016/0295254 | A1* | 10/2016 | Chen | .................... | H04N 21/2662 |
| 2017/0237794 | A1* | 8/2017 | Jarvi | ............... | H04N 21/234309 709/203 |
| 2017/0237987 | A1* | 8/2017 | Seigneurbieux | ...... | H04N 19/146 375/240.02 |
| 2017/0272496 | A1* | 9/2017 | Eyler | ........................ | H04L 65/80 |
| 2017/0331666 | A1* | 11/2017 | Walker | .................. | H04N 21/234 |
| 2018/0084256 | A1* | 3/2018 | Luthra | ..................... | H04L 67/02 |
| 2018/0098083 | A1* | 4/2018 | Mcallister | ............. | H04N 19/103 |
| 2018/0213015 | A1* | 7/2018 | Jain | ................... | H04N 21/44029 |
| 2018/0234978 | A1* | 8/2018 | Shao | ..................... | H04W 72/0453 |
| 2018/0255362 | A1* | 9/2018 | Chittella | ........... | H04N 21/47202 |
| 2019/0124411 | A1* | 4/2019 | Surcouf | ................. | G06F 16/955 |
| 2020/0310869 | A1* | 10/2020 | Maeda | .................. | G06F 9/4881 |
| 2021/0092461 | A1* | 3/2021 | Gadgil | ................. | H04N 19/186 |
| 2021/0203987 | A1* | 7/2021 | Taibi | .................... | H04N 21/43072 |
| 2021/0224068 | A1* | 7/2021 | Brewer | .............. | G06F 15/17325 |

OTHER PUBLICATIONS

Heng et al., "A Highly Parallelized H.265/HEVC real-time UHD software encoder", 2014 International Conference on Image Processing, Oct. 2014.*

* cited by examiner

VIDEO ENCODING FOR LOW-CONCURRENCY LINEAR CHANNELS

BACKGROUND

The delivery of digital video to viewers almost inevitably requires various instances of video encoding. However, video encoding is a computationally intensive task. When video encoding services are provided in a public cloud computing environment, such services are often charged on a per-minute basis. Yet in the case of linear video programming, particularly for "long-tail" low-concurrency channels (also referred to as low-viewership channels), there may be no viewers for some period of time, even during a broadcast. A low-concurrency channel may include a local public-access, educational-access, or government-access channel, for example. Thus, for such a channel, there is a fair likelihood that the computational resources (e.g., the per-minute charges) used to continuously encode the channel may be wasted because the resultant encoded video may not actually be seen by a viewer.

Under traditional cloud-based techniques, it may take several minutes from the time of initially receiving a request for an encoded video stream before a cloud-based real-time linear (RTL) encoder is actually able to provide the requested stream. For example, it may take a significant amount of time (e.g., several minutes) for a cloud-based system to create an instance of and/or start a new RTL encoder for servicing the request. Such a delay may be unacceptable to viewers, particularly in the case of linear programming, because they expect a near instantaneous switch between channels.

These and other shortcomings are addressed in the present disclosure.

SUMMARY

Systems, methods, and devices relating to video encoding for low-concurrency linear channels are described herein.

A viewer may initially tune to a channel on his or her video output device, which may generate a manifest request for the channel. The manifest request may be received by a cloud video processing system. Based on the manifest request, the video processing system may request for a real-time linear (RTL) encoder to be started to encode the input compressed video stream for the channel, although there may be some delay before the RTL encoder is fully started and ready to encode the video stream in real time. Also based on the manifest request, the video processing system may assign a faster-than-real-time (FTRT) encoder from a pool of already-running FTRT encoders to encode the video stream until the RTL encoder is fully started. The FTRT encoder may be configured to encode the video stream at a lower quality level than the RTL encoder. Such lower quality level, as well as the fact that the FTRT encoder is already started, may enable the video stream to be encoded almost immediately, thereby allowing the encoded video stream to be delivered to the video output device very shortly after the viewer tuned to the channel. Once the RTL encoder is fully started and ready, the video processing system may switch the encoding from the FTRT encoder to the RTL encoder. The FTRT encoder may be returned to the FTRL encoder pool until it is needed again.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices.

Aspects of the disclosure will now be described in detail with reference to the drawings, wherein like reference numbers refer to like elements throughout, unless specified otherwise.

DETAILED DESCRIPTION

Systems, methods, and devices relating to video encoding for low-concurrency linear channels are described. Such video encoding may refer to cloud-based, on-demand video encoding. As used herein, an encoder may comprise a transcoder. Likewise, encoding may comprise transcoding.

Figure 1:
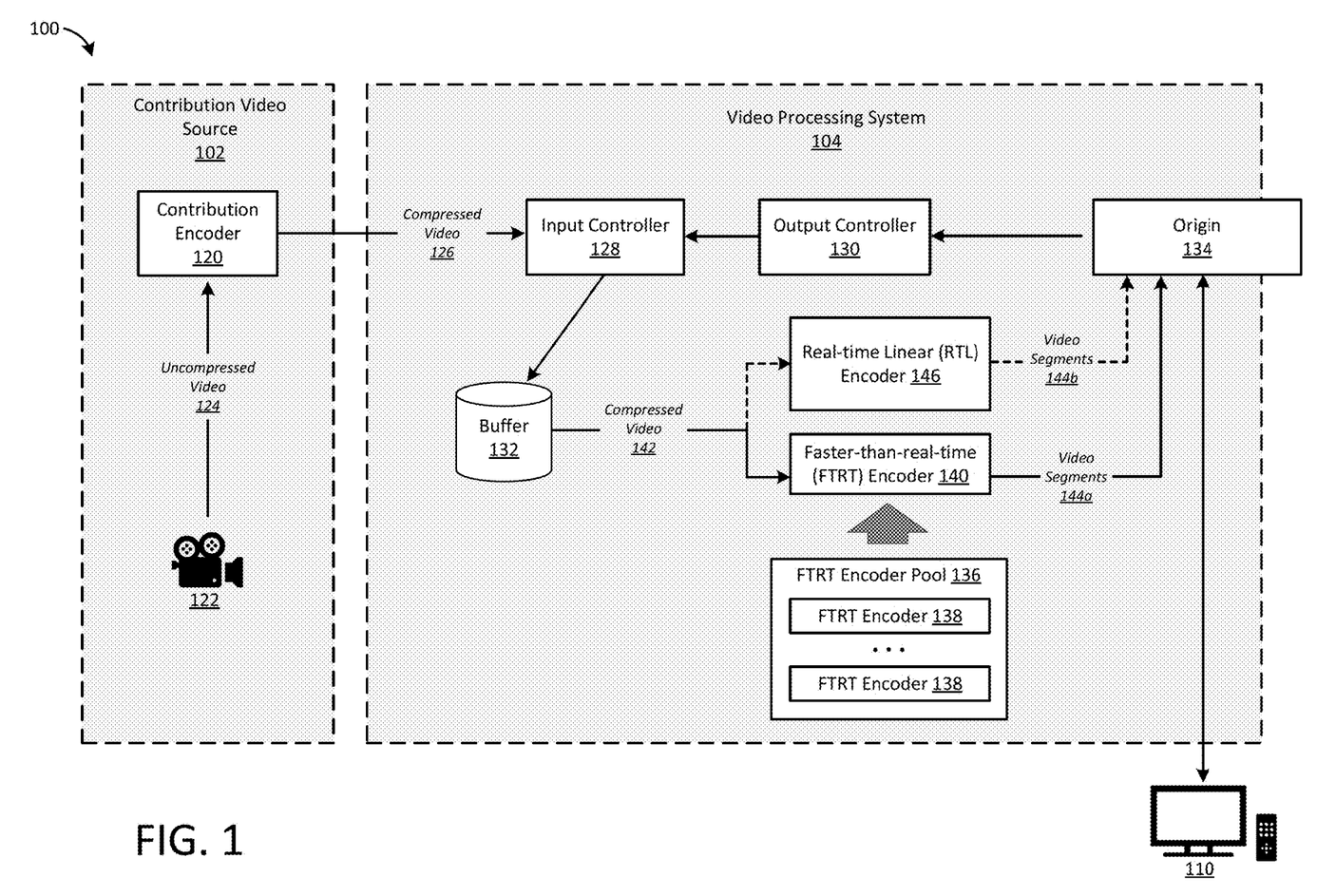
FIG. 1 is a block diagram of an example system and data flow.

FIG. 1 is a diagram of a system 100 and associated data flow. The system 100 comprises a contribution video source 102 that provides compressed video 126 to a video processing system 104. Via the video-encoding techniques described herein, the video processing system 104 delivers an encoded video stream (e.g., encoded video segments) to a video output device 110 for viewer consumption. Such video stream may comprise linear video programming. The video processing system 104 may be implemented in a cloud computing environment or platform. Various functions performed by the video processing system 104, such as the video encoding functions, may be charged by the cloud computing operator on a time basis (e.g., per minute basis) with respect to CPU usage, encoding time, and/or the length of the output encoded video.

The video processing system 104 may comprise an input controller 128, an output controller 130, a buffer 132, and a faster-than-real-time (FTRT) encoder pool 136. The input controller 128 may be generally configured to receive compressed video 126 and store the most recent portions in the buffer 132 for encoding. The output controller 130 may be generally configured to manage encoding operations and coordinate delivery of the encoded video to video output devices, including starting/stopping RTL encoder(s) and selecting (e.g., activating/deactivating) FTRT encoder(s) from the FTRT encoder pool 136. The FTRT encoder pool 136 may comprise one or more running FTRT encoders 138 configured to temporarily perform expedited encoding until a newly-started RTL encoder 146 is able to maintain real-time encoding for a requested channel. Real-time encoding may refer to outputting encoded video at a rate equal to the rate at which the video is received. For example, an RTL encoder may encode one second worth of video in one second. By contrast, faster-than-real-time encoding may refer to outputting encoded video at a rate greater than the rate at which the video is received. For example, an FTRT encoder may encoder one second worth of video in one tenth of a second.

The video output device 110 may be configured to decode the encoded video stream provided by the video processing system 104 and cause output of the decoded video stream to a viewer. The video output device 110 may comprise, for example, a smart television, a set-top box (e.g., a cable set-top box), a laptop computer, a smart phone or other mobile device, a tablet computer, a personal computer, a digital media player, or a gaming console. The video output device 110 may be configured to receive viewer input to select a channel.

As noted, the contribution video source 102 may transmit compressed video 126 to the video processing system 104, the input controller 128 in particular. The compressed video 126 may be in the form of video stream. The contribution video source 102 may be associated with a television network, a content provider, or a content creator, as examples. For instance, the contribution video source 102 may provide the linear programming of a television channel. The techniques described herein may be particularly apt when the television channel is a low-concurrency channel (e.g., a channel with low viewership).

A low-concurrency channel may comprise a public-access channel, an education-access channel, or a government-access channel (a so-called PEG channel). As examples, video programming on low-concurrency channels may include a city council meeting, a local sports game, a religious service, or a local interest program. A low-concurrency channel may provide video programming during only portions of the 24-hour day. For example, a low-concurrency channel may be off-air during the early morning hours, in which case a black screen or a bar signal may be shown on the channel. Even when broadcasting a program, a low-concurrency channel may sometimes still have no viewers. A low-concurrency channel may be defined as a channel with a viewership probability (e.g., the probability of at least one viewer) that is less than a pre-determined threshold.

The contribution video source 102 may comprise a contribution encoder 120 to encode (e.g., compress) uncompressed video 124 received from a video source 122. The uncompressed video 124 may be in a raw video format. The compressed video 126 output by the contribution encoder 120 may be in a "mezzanine" or intermediate format, such as DNxHD/DNxHR, Prores 422/422 HQ/4444, JPEG 2000, or high-quality high-bitrate H.264 (AVC) and H.265 (HEVC). The compressed video 126 may be transmitted to the video processing system 104 as a (high quality) video signal of a particular linear television channel.

The input controller 128 may receive the compressed video 126 from the contribution encoder 120 as a linear video stream and store the most recent portions of the compressed video 126 stream in the buffer 132. For example, the input controller 128 may store the last several seconds (or other pre-defined portion) of the compressed video 126 stream in the buffer 132. The buffer 132 may comprise a volatile or non-volatile memory buffer or a fast non-volatile storage medium (e.g., a solid-state drive).

A viewer may tune the video output device 110 to the particular channel associated with the compressed video 126, at which time the video output device 110 may transmit a request for a manifest (e.g., a DASH MPD or an HLS playlist) to the origin 134. In connection with FIG. 2, at step 202, the request for the manifest may be received and serviced by an HTTP server of the origin 134. The request for the manifest may comprise an HTTP GET request. The origin 134 may be implemented as part of the video processing system 104 or may be a distinct system. The manifest request (and other forms of data) may be received by the origin 134 via a content distribution network (CDN). Likewise, encoded video (and other forms of data) may be transmitted from the origin 134 to the video output device 110 via the CDN.

Figure 2:
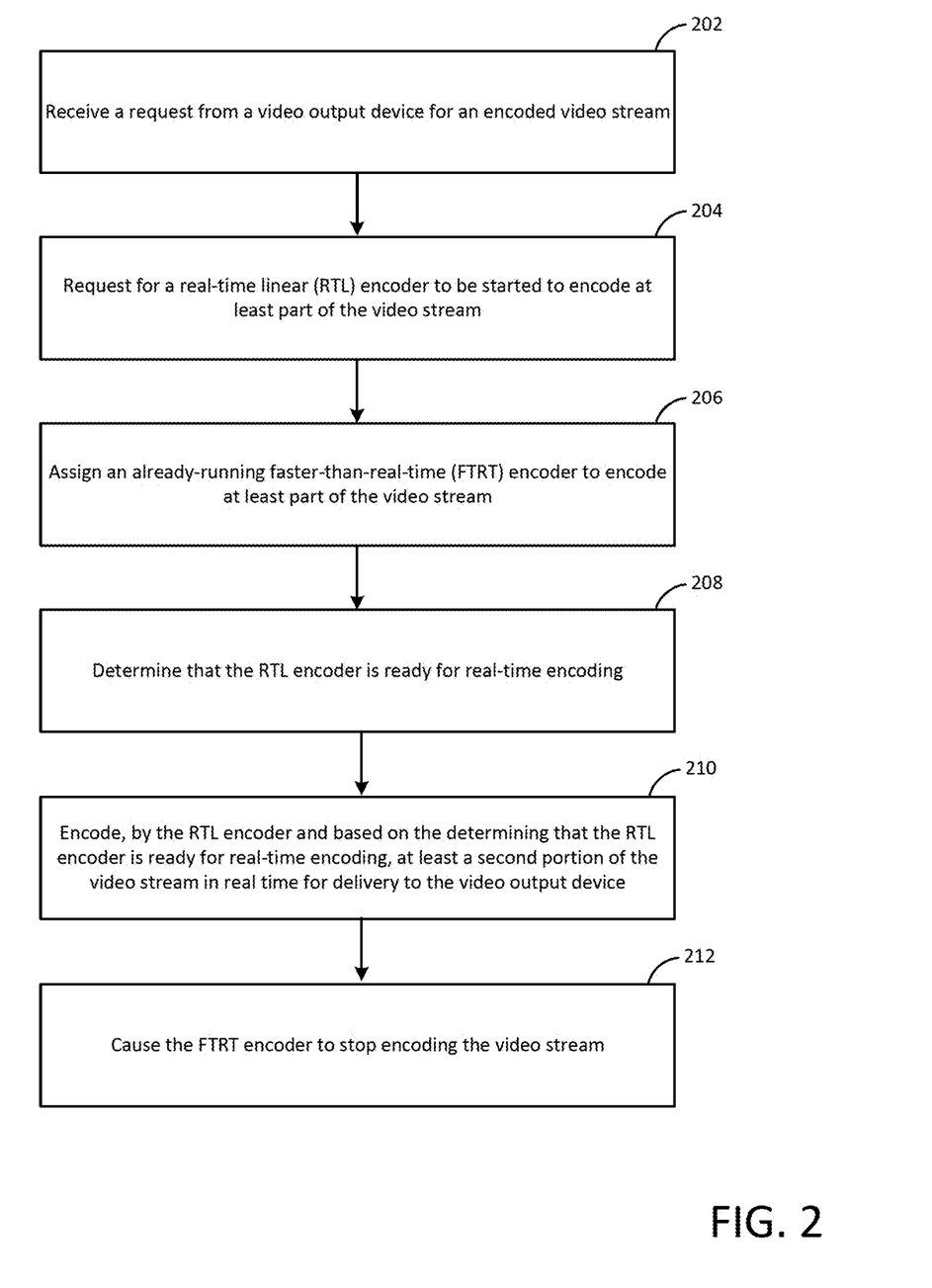
FIG. 2 is a flow diagram of an example method.

The origin 134 may transmit the manifest request to the output controller 130 or otherwise notify the output controller 130 of the manifest request. Based on the manifest request, at step 204, the output controller 130 may start the new RTL encoder 146 for encoding the compressed video 142 in real time. Starting the RTL encoder 146 may comprise submitting a start request to the cloud computing platform that implements the video processing system 104. The RTL encoder 146 may be configured to encode the compressed video 142 from the buffer 132 at a quality level (e.g., with respect to bitrate, resolution, etc.) normally expected for the requested channel. This quality level may be pre-determined. The RTL encoder 146 may also be configured to encode the compressed video 142 at lower or alternate quality levels (e.g., at a lower resolution or bitrate) should the conditions dictate, i.e., implement adaptive bitrate streaming. For example, an HLS video stream implementation may encode video at twelve different quality levels, per recommendations currently in force.

Based on the manifest request, at step 206, the output controller 130 may select (e.g., activate) an FTRT encoder 140 from the one or more FTRT encoders 138 of the FTRT encoder pool 136 and assign that FTRT encoder 140 to encode the compressed video 142 from the buffer 132. The FTRT encoder(s) 138 may be already running and ready to encode compressed video at this time. The encoded video segments output by the FTRT encoder 140 are indicated in FIG. 1 as the video segments 144a. The output controller 130 may request the contents of the buffer 132 and an identifier of the contribution video source 102 (e.g., IP/port combination) from the input controller 128 and pass these to the RTL encoder 146 and/or the selected FTRT encoder 140 as the video data input for encoding.

An FTRT encoder may be configured to encode video at a quality level less than that of the RTL encoder 146, at least initially. For example, the FTRT encoder 140 may encode video at a lower resolution and/or bitrate than the RTL encoder 146. An FTRT encoder may also encode video at more than one quality level, although to a lesser extent than the RTL encoder 146. For example, an FTRT encoder may be configured at any one time to encode video at three different quality levels. The first quality level (e.g., bitrate) may be that of the encoded video stream being sent to the video output device 110 at that time. The second quality level may be one step higher in quality (e.g., the next highest bitrate) than the first quality level and the third quality level may be one step lower in quality (e.g., the next lowest bitrate) than the first quality level. Should the video output device 110 switch to the video stream encoded at the second or third quality level, the FTRT encoder's 140 three quality levels may be shifted up or down accordingly.

As noted, the FTRT encoder pool 136 may maintain one or more running FTRT encoders 138 that are ready to be assigned (e.g., activated) to encode a particular channel's compressed video stream. The number of FTRT encoders 138 of the FTRT encoder pool 136 may be far less than the total number of channels (e.g., low-concurrency channels) that the video processing system 104 may potentially need to encode. For example, the FTRT encoder pool 136 may maintain a single FTRT encoder 138 for every hundred, or even thousand, low-concurrency channels serviced by the video processing system 104. This may be acceptable because there may be a very low probability that any given low-concurrency channel is watched by a viewer, thus making a probability of multiple viewers joining different low-concurrency channels at the same time interval (e.g., a two minute time interval) extremely low. By contrast, for higher-viewership channels, there may be at least one RTL encoder actively encoding the video stream at all times for each channel. The number of FTRT encoders 138 of the FTRT encoder pool 136 may be dynamic according to the number of requests to view low-concurrency channels. For example, if the number of free FTRT encoders 138 (e.g., not currently assigned to encode a channel) is less than a pre-defined threshold, the video processing system 104 may start new FTRT encoders 138 for the FTRT encoder pool 136 and/or convert an RTL encoder that is no longer needed to an FTRT encoder and assign it to the FTRT encoder pool 136.

The time between when the manifest request is received by the origin 134 and when the video output device 110 requests an initial video segment may be as short as 100 ms. Hence, the FTRT encoder 140 may be configured to encode compressed video at a rate that is significantly faster than real time. This may allow the output controller 130 to indicate a particular segment and a planned location for the segment (e.g., a URL of the segment at the origin 134) in a manifest before the segment is actually encoded. Once encoded, the encoded segment may be stored at the location indicated in the manifest. The FTRT encoder 140 may gradually increase the quality level (e.g. higher bitrates or resolutions) of its encoded video output over time as the FTRT encoder 140 catches up with real time.

The selected FTRT encoder 140 may be assigned to encode the compressed video 142 from the buffer only temporarily until the RTL encoder 146 is capable of encoding the compressed video 142 in real time for delivery to the video output device 110. The initial, additional use of the FTRT encoder 140 may provide several advantages over relying solely on the RTL encoder 146. For example, the FTRT encoder 140 (and the other FTRT encoders 138 of the FTRT encoder pool 136) may be already running at the time that the output controller 130 receives the manifest request and may be ready to begin encoding the compressed video 142 from the buffer 132 almost immediately. By contrast, it may often take one minute or more for the RTL encoder 146 to initialize and become ready to encode the compressed video 142 in real time. In addition, although the FTRT encoder 140 may be configured to initially encode at a lower quality level than the RTL encoder 146, this may also enable it to encode in real time much sooner than the RTL encoder 146 would be able to. In other words, the FTRT encoder 140 may sustain the first minute or two (for example) of the encoded video stream until the RTL encoder 146 is able to take over the real-time encoding duties in full.

Based on the manifest request, the output controller 130 may generate the requested manifest and transmit it to the origin 134 for delivery to the video output device 110. The manifest may include gap signaling (e.g., EXT-X-GAP tag(s) in HLS manifests) and use DASH "miss" segments and/or failover content signaling using the FCS element in the DASH MPD for any video segments at the quality levels that are not yet available (e.g., not yet encoded by the RTL encoder 146 or the FTRT encoder 140). The output controller 130 may generate one or more initialization segments indicating various parameters of the video stream, such as a channel identifier, resolution, or frame rate. The initialization segments may be transmitted to the origin 134 for delivery to the video output device 110. The above operations performed by the output controller 130 based on the manifest request may be performed by the output controller 130 in parallel or nearly in parallel. For example, the output controller 130 may simultaneously or near simultaneously request for the RTL encoder 146 to be started and assign the FTRT encoder 140 to start encoding.

The manifest may be sent to the requesting video output device 110, via the origin 134, in an HTTP response. The manifest may be marked as non-cacheable. The video output device 110 may process the manifest, download the initialization segments if any, request any DRM license, and request a video segment indicated in the manifest.

At step 208, it may be determined that the RTL encoder 146 is fully started and ready for real-time encoding. This may be performed by monitoring one or more application programing interfaces (APIs). For example, when the RTL encoder 146 is up and ready, the RTL encoder 146 may issue an API call to the output controller 130 (e.g., the output controller 130 receives the API call) to indicate as such. The API call may also indicate that the RTL encoder 146 will output its first frame at a specified time. The output controller 130 may communicate with the RTL encoder 146 and the FTRT encoder 140 to determine the handoff point from the FTRT encoder 140 to the RTL encoder 146.

Based on the determination that the RTL encoder 146 is started and ready for real-time encoding, at step 210, the output controller 130 may switch encoding from the FTRT encoder 140 to the RTL encoder 146. At step 212, the FTRT encoder 140 may be stopped and returned to the FTRT encoder pool 136 as an available FTRT encoder. Once switched over, the RTL encoder 146 may encode, in real time, the compressed video 142 from the buffer 132 and/or compressed video received from the contribution video source 102 (e.g., the compressed video 126) and transmit the encoded video (indicated as video segments 144b in FIG. 1) to the origin 134. The line in FIG. 1 indicating the encoded video segments 144b is a dashed line to reflect that the RTL encoder 146 may not initially be able to encode these video segments in real time. Likewise, the portions of the line in FIG. 1 indicating the transmission of the compressed video 142 to the RTL encoder 146 is also a dashed line to reflect that the RTL encoder 146 may not initially be started and ready to receive the compressed video 142.

Whether encoded by the RTL encoder 146 or the FTRT encoder 140, the origin 134 (e.g., a HTTP server thereof) may transmit the encoded video stream to the requesting video output device 110. In case a video segment is not 100% complete by the time it was requested, the HTTP server may use the HTTP chunked transfer mode and return frames of the video segment as they become available.

The output controller 130 may keep track of the last time a video segment and/or manifest were requested for the channel. That is, the output controller 130 may keep track of whether the channel is still being viewed. After determining that a pre-defined timeout period (e.g., five minutes) is expired without receiving any requests for a video segment or manifest, the output controller 130 may shut down the RTL encoder 146 and/or return the FTRT encoder 140 to the FTRT encoder pool 136. Alternatively, the output controller 130 may designate as or convert the RTL encoder 146 to an FTRT encoder 138 of the FTRT encoder pool 136 rather than shutting it down.

The video processing system 104 may account for the case where a channel is off the air or otherwise not broadcasting video programming, yet a viewer is still tuned to the channel (e.g., still requesting video segments for the channel). The input controller 128 may analyze the buffer 132 and determine whether the compressed video 126 from the contribution video source 102 contains programming content. For example, it may decode the frames and attempt to detect an all-black, color bars, or pre-recorded slate video signal. Additionally or alternatively, the contribution video source 102 may send an indication of a lack of video content. If a manifest request for the channel reaches the output controller 130, it may request the channel status from the input controller 128. If the input controller 128 detects no video content in the compressed video 126 or determines an absence of the compressed video 126 altogether, the output controller 130 may return a "canned" segment comprising a pre-recorded slate, a black frame, or a color bars signal. The same canned segment may be returned for all segment requests, with possible modification of timestamps (e.g., PCR, PTS, and DTS for MPEG-2; or "prdf" and "tfdt" in ISO-BMFF/CMAF) in order to allow for smooth playback. Additionally or alternatively, a lack of video content may cause the output controller 130 to instruct the origin 134 to return an HTTP error status (e.g., a 404 response) in response to a manifest request.

The components of the system 100, including the contribution video source 102, the video processing system 104, the origin 134, and the video output device 110, may communicate via a network. The network may comprise a private portion. The network may comprise a public portion, such as the Internet. The network may comprise a content distribution and/or access network. The network may comprise a cable television network. The network may comprise fiber, cable, or a combination thereof. The network may comprise wired links, wireless links, a combination thereof, and/or the like. The network may comprise routers, switches, nodes, gateways, servers, modems, and/or the like.

Figure 3:
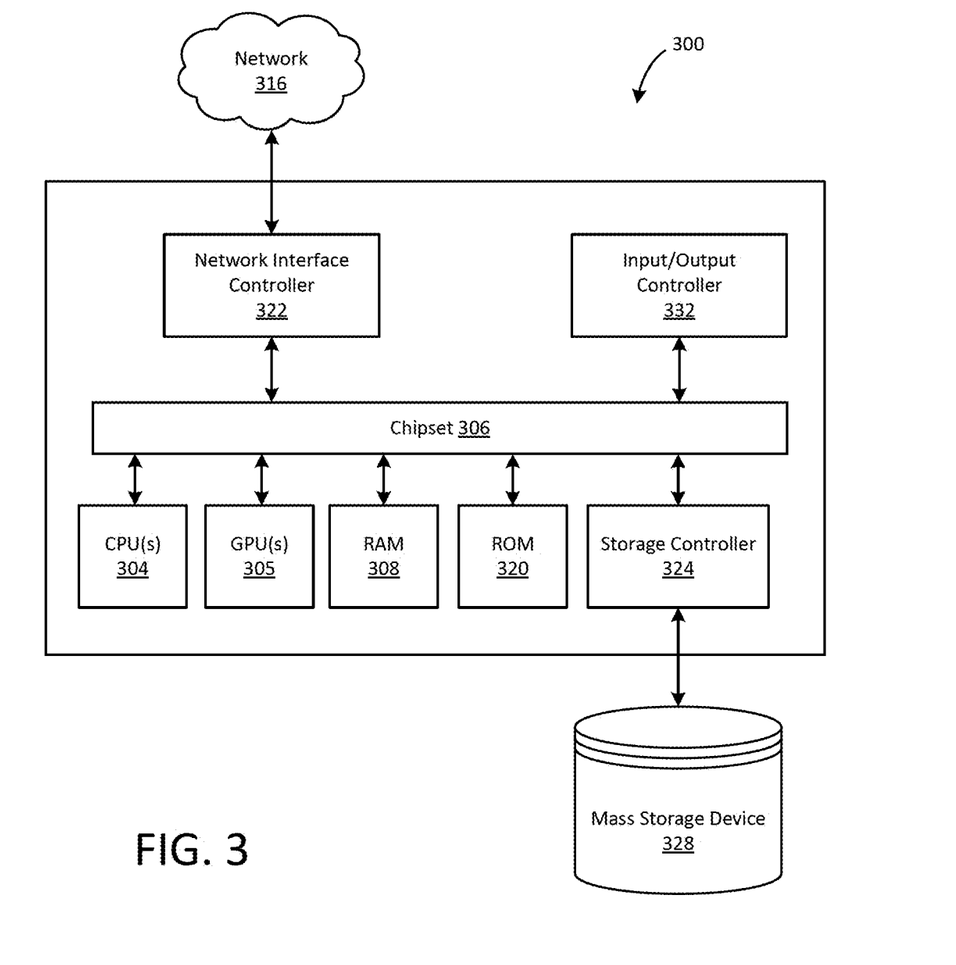
FIG. 3 is a block diagram of an example computing device.

FIG. 3 depicts an example computing device in which the systems, methods, and devices disclosed herein, or all or some aspects thereof, may be embodied. For example, components such as the contribution video source 102, the video processing system 104, the origin 134, and the video output device 110 may be implemented generally in a computing device and/or a plurality of networked computing devices, such as the computing device 300 of FIG. 3. The computing device of FIG. 3 may be all or part of a server, workstation, desktop computer, laptop, tablet, network appliance, PDA, e-reader, digital cellular phone, set top box, or the like, and may be utilized to implement any of the aspects of the systems, methods, and devices described herein.

The computing device 300 may include a baseboard, or "motherboard," which is a printed circuit board to which a multitude of components or devices may be connected by way of a system bus or other electrical communication paths. One or more central processing units (CPUs) 304 may operate in conjunction with a chipset 306. The CPU(s) 304 may be standard programmable processors that perform arithmetic and logical operations necessary for the operation of the computing device 300.

The CPU(s) 304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 304 may be augmented with or replaced by other processing units, such as GPU(s) 305. The GPU(s) 305 may comprise processing units specialized for but not necessarily limited to highly parallel computations, such as graphics and other visualization-related processing.

A chipset 306 may provide an interface between the CPU(s) 304 and the remainder of the components and devices on the baseboard. The chipset 306 may provide an interface to a random access memory (RAM) 308 used as the main memory in the computing device 300. The chipset 306 may further provide an interface to a computer-readable storage medium, such as a read-only memory (ROM) 320 or non-volatile RAM (NVRAM) (not shown), for storing basic routines that may help to start up the computing device 300 and to transfer information between the various components and devices. ROM 320 or NVRAM may also store other software components necessary for the operation of the computing device 300 in accordance with the aspects described herein.

The computing device 300 may operate in a networked environment using logical connections to remote computing nodes and computer systems through local area network (LAN) 516. The chipset 306 may include functionality for providing network connectivity through a network interface controller (NIC) 322, such as a gigabit Ethernet adapter. A NIC 322 may be capable of connecting the computing device 300 to other computing nodes over a network 316. It should be appreciated that multiple NICs 322 may be present in the computing device 300, connecting the computing device to other types of networks and remote computer systems.

The computing device 300 may be connected to a mass storage device 328 that provides non-volatile storage for the computer. The mass storage device 328 may store system programs, application programs, other program modules, and data, which have been described in greater detail herein. The mass storage device 328 may be connected to the computing device 300 through a storage controller 324 connected to the chipset 306. The mass storage device 328 may consist of one or more physical storage units. A storage controller 324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 300 may store data on a mass storage device 328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 328 is characterized as primary or secondary storage and the like.

For example, the computing device 300 may store information to the mass storage device 328 by issuing instructions through a storage controller 324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 300 may further read information from the mass storage device 328 by detecting the physical states or characteristics of one or more particular locations within the physical storage units.

In addition to the mass storage device 328 described above, the computing device 300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 328 depicted in FIG. 3, may store an operating system utilized to control the operation of the computing device 300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 328 may store other system or application programs and data utilized by the computing device 300.

The mass storage device 328 or other computer-readable storage media may also be encoded with computer-executable instructions, which, when loaded into the computing device 300, transforms the computing device from a general-purpose computing system into a special-purpose computer capable of implementing the aspects described herein. These computer-executable instructions transform the computing device 300 by specifying how the CPU(s) 304 transition between states, as described above. The computing device 300 may have access to computer-readable storage media storing computer-executable instructions, which, when executed by the computing device 300, may perform the methods described herein.

A computing device, such as the computing device 300 depicted in FIG. 3, may also include an input/output controller 332 for receiving and processing input from a number of input devices, such as a keyboard, a mouse, a touchpad, a touch screen, an electronic stylus, or other type of input device. Similarly, an input/output controller 332 may provide output to a display, such as a computer monitor, a flat-panel display, a digital projector, a printer, a plotter, or other type of output device. It will be appreciated that the computing device 300 may not include all of the components shown in FIG. 3, may include other components that are not explicitly shown in FIG. 3, or may utilize an architecture completely different than that shown in FIG. 3.

As described herein, a computing device may be a physical computing device, such as the computing device 300 of FIG. 3. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the systems, methods, and devices are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described systems, methods, and devices. When combinations, subsets, interactions, groups, etc., of these components are described, it is understood that while specific references to each of the various individual and collective combinations and permutations of these may not be explicitly described, each is specifically contemplated and described herein, for all systems, methods, and devices. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the systems, methods, and devices may take the form of an entirely hardware embodiment, an entirely software embodiment, or an embodiment combining software and hardware aspects. Furthermore, the systems, methods, and devices may take the form of a computer program product on a computer-readable storage medium having computer-readable program instructions (e.g., computer software) embodied in the storage medium. More particularly, the present systems, methods, and devices may take the form of web-implemented computer software. Any suitable computer-readable storage medium may be utilized including hard disks, CD-ROMs, optical storage devices, or magnetic storage devices.

Embodiments of the systems, methods, and devices are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the systems, methods, and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   receiving, from a video output device, a request for an encoded video stream;
   requesting, based on receiving the request, a real-time linear (RTL) encoder that is not started to be started;
   assigning, from faster-than-real-time (FTRT) encoders that are already started, an FTRT encoder to encode at least part of the video stream;
   causing the assigned FTRT encoder to encode at least a first portion of the video stream for delivery to the video output device;
   based on determining that the requested RTL encoder has been started, causing the FTRT encoder to stop encoding the at least the first portion of the video stream and causing the requested RTL encoder to encode at least a second portion of the video stream for delivery to the video output device.

2. The method of claim 1, wherein the assigning the FTRT encoder to encode at least part of the video stream comprises:
   selecting the FTRT encoder from a pool of one or more FTRT encoders that are already started.

3. The method of claim 2, further comprising:
assigning, based on the causing the FTRT encoder to stop encoding the video stream, the FTRT encoder back to the pool of one or more FTRT encoders that are already started.

4. The method of claim 1, wherein the at least part of the video stream to be encoded by the FTRT encoder comprises buffered compressed video received from a contribution video source.

5. The method of claim 1, wherein the video stream is associated with a channel selected by a viewer.

6. The method of claim 1, wherein the causing the assigned FTRT encoder to encode at least a first portion of the video stream comprises encoding the at least the first portion of the video stream in faster-than-real time.

7. The method of claim 1, wherein the causing the assigned FTRT encoder to encode at least a first portion of the video stream comprises transitioning from encoding in faster-than-real time to encoding in real time.

8. The method of claim 1, wherein:
the causing the assigned FTRT encoder to encode at least a first portion of the video stream comprises encoding at a first bitrate, and the causing the requested RTL encoder to encode at least a second portion of the video stream comprises encoding at a second bitrate greater than the first bitrate.

9. The method of claim 1, wherein:
the causing the assigned FTRT encoder to encode at least a first portion of the video stream comprises encoding at a first video resolution, and the causing the requested RTL encoder to encode at least a second portion of the video stream comprises encoding at a second video resolution greater than the first video resolution.

10. The method of claim 1, wherein the determining that the RTL encoder has been started is based on receiving an application programming interface (API) call from the RTL encoder.

11. A device comprising:
one or more processors; and
memory storing instructions that, when executed by the one or more processors, cause the device to:
receive, from a video output device, a request for an encoded video stream;
request, based on receiving the request, for a real-time linear (RTL) encoder that is not started to be started;
assign, from faster-than-real-time (FTRT) encoders that are already started, an FTRT encoder to encode at least part of the video stream;
cause the assigned FTRT encoder to encode at least a first portion of the video stream for delivery to the video output device;
based on determining that the requested RTL encoder has been started, cause the FTRT encoder to stop encoding the at least the first portion of the video stream and cause the requested RTL encoder to encode at least a second portion of the video stream for delivery to the video output device.

12. The device of claim 11, wherein the instructions, when executed, cause the device to assign the FTRT encoder to encode at least part of the video stream by:
selecting the FTRT encoder from a pool of one or more FTRT encoders that are already started.

13. The device of claim 12, wherein the instructions, when executed, further cause the device to:
assign, based on the causing the FTRT encoder to stop encoding the video stream, the FTRT encoder back to the pool of one or more FTRT encoders that are already started.

14. The device of claim 11, wherein the at least part of the video stream to be encoded by the FTRT encoder comprises buffered compressed video received from a contribution video source.

15. The device of claim 11, wherein the causing the assigned FTRT encoder to encode at least a first portion of the video stream comprises encoding the at least the first portion of the video stream in faster-than-real time.

16. The device of claim 11, wherein the instructions, when executed, cause the device to cause the assigned FTRT encoder to encode at least a first portion of the video stream by transitioning from encoding in faster-than-real time to encoding in real time.

17. A non-transitory computer-readable medium storing instructions that, when executed by one or more processors, cause:
receiving, from a video output device, a request for an encoded video stream;
requesting, based on receiving the request, a real-time linear (RTL) encoder that is not started to be started;
assigning, from faster-than-real-time (FTRT) encoders that are already started, an FTRT encoder to encode at least part of the video stream;
causing the assigned FTRT encoder to encode at least a first portion of the video stream for delivery to the video output device;
based on determining that the requested RTL encoder has been started, causing the FTRT encoder to stop encoding the at least the first portion of the video stream and causing the requested RTL encoder to encode at least a second portion of the video stream for delivery to the video output device.

18. The non-transitory computer-readable medium of claim 17, wherein the instructions, when executed, cause assigning the FTRT encoder to encode at least part of the video stream by:
selecting the FTRT encoder from a pool of one or more FTRT encoders that are already started.

19. The non-transitory computer-readable medium of claim 18, wherein the instructions, when executed, further cause:
assigning the FTRT encoder back to the pool of one or more FTRT encoders that are already started.

20. The non-transitory computer-readable medium of claim 17, wherein the at least part of the video stream to be encoded by the FTRT encoder comprises buffered compressed video received from a contribution video source.

21. The method of claim 1, wherein the determining that the RTL encoder has been started is while the FTRT encoder is encoding the at least first portion of the video stream.

22. The method of claim 1, wherein the FTRT encoder is different from the RTL encoder.

23. The method of claim 22, wherein the causing the requested RTL encoder to encode at least the second portion of the video stream for delivery to the video output device comprises switching encoding from the FTRT encoder to the RTL encoder.

* * * * *